United States Patent
Xia et al.

(10) Patent No.: US 10,281,652 B2
(45) Date of Patent: May 7, 2019

(54) TWO-PORT HIGH ISOLATION FILTER

(71) Applicant: Alliance Fiber Optic Products, Inc., Sunnyvale, CA (US)

(72) Inventors: Chen Xia, Fremont, CA (US); Yao Li, Newark, CA (US)

(73) Assignee: Alliance Fiber Optic Products, Inc., Sunnyvale, CA (US)

(*) Notice: Subject to any disclaimer, the term of this patent is extended or adjusted under 35 U.S.C. 154(b) by 11 days.

(21) Appl. No.: 15/637,451

(22) Filed: Jun. 29, 2017

(65) Prior Publication Data

US 2018/0052076 A1 Feb. 22, 2018

Related U.S. Application Data

(60) Provisional application No. 62/494,642, filed on Aug. 16, 2016, provisional application No. 62/375,580, filed on Aug. 16, 2016.

(51) Int. Cl.
| | |
|---|---|
| *G02B 6/28* | (2006.01) |
| *G02B 6/293* | (2006.01) |
| *G01M 11/00* | (2006.01) |

(52) U.S. Cl.
CPC ......... *G02B 6/2937* (2013.01); *G02B 6/2817* (2013.01); *G02B 6/29368* (2013.01); *G02B 6/29383* (2013.01); *G01M 11/3109* (2013.01); *G01M 11/3145* (2013.01); *G01M 11/3154* (2013.01); *G02B 6/29379* (2013.01)

(58) Field of Classification Search
None
See application file for complete search history.

(56) References Cited

U.S. PATENT DOCUMENTS

| | | | |
|---|---|---|---|
| 6,748,133 B2 | 6/2004 | Liu et al. | |
| 7,224,865 B1 | 5/2007 | Wang et al. | |
| 7,440,163 B1* | 10/2008 | Zhou | G02B 6/29361 |
| | | | 359/333 |
| 7,486,891 B1 | 2/2009 | Yao et al. | |

(Continued)

FOREIGN PATENT DOCUMENTS

| | | |
|---|---|---|
| EP | 1860472 A1 | 11/2007 |
| WO | 2011098939 A1 | 8/2011 |
| WO | 2017007749 A1 | 1/2017 |

*Primary Examiner* — Jerry Rahll
(74) *Attorney, Agent, or Firm* — Adam R. Weeks (57) ABSTRACT

An optical signal isolation device comprising a common port, an isolated diagnostic port, an integrated circulator comprising an input circulator fiber, an output circulator fiber, and a fiber-to-fiber optical coupler configured to couple an isolated optical signal propagating along the input circulator fiber to the output circulator fiber for propagation along the output circulator fiber, a multi-fiber alignment body that secures at least portions of each of the multi-signal fiber, the isolated diagnostic signal fiber, the input circulator fiber, and the output circulator fiber, and a wavelength-selective optical assembly including an optical signal filter, fiber-to-filter focusing optics, and a communications signal reflector. The integrated circulator and the wavelength selective optical assembly are configured such that the communications component is retro-reflected back to the common port and the diagnostic component is passes out of the isolated diagnostic port.

21 Claims, 5 Drawing Sheets

(56) References Cited

U.S. PATENT DOCUMENTS

| | | | |
|---|---|---|---|
| 7,672,554 B1 | 3/2010 | Wang et al. | |
| 7,843,644 B1 | 11/2010 | Wang et al. | |
| 7,912,374 B1 | 3/2011 | Wang et al. | |
| 8,538,209 B1 | 9/2013 | Li et al. | |
| 8,693,866 B1 | 4/2014 | Lam et al. | |
| 9,590,759 B1 | 3/2017 | Peng et al. | |
| 2001/0012147 A1* | 8/2001 | Lutz | H01S 3/10023 |
| | | | 359/337.2 |
| 2002/0094172 A1* | 7/2002 | Brun | G02B 6/2937 |
| | | | 385/78 |
| 2003/0099430 A1* | 5/2003 | Li | G02B 6/3524 |
| | | | 385/18 |
| 2003/0108297 A1* | 6/2003 | Lee | G02B 6/2937 |
| | | | 385/47 |
| 2003/0228101 A1* | 12/2003 | Tai | G02B 6/29361 |
| | | | 385/34 |
| 2004/0101235 A1* | 5/2004 | Chamness | G02B 6/2937 |
| | | | 385/24 |
| 2004/0114932 A1* | 6/2004 | Tanaka | G02B 6/29389 |
| | | | 398/85 |
| 2005/0074204 A1* | 4/2005 | Wilson | G02B 6/2931 |
| | | | 385/24 |
| 2007/0041683 A1* | 2/2007 | Keyworth | G02B 6/12019 |
| | | | 385/24 |
| 2017/0212006 A9* | 7/2017 | Peng | G01M 11/3154 |

* cited by examiner

TWO-PORT HIGH ISOLATION FILTER

CROSS-REFERENCE TO RELATED APPLICATIONS

This application claims the benefit of U.S. Provisional Application Ser. Nos. 62/494,642, filed Aug. 16, 2016, and 62/375,580, filed Aug. 16, 2016.

BACKGROUND

Field

The present disclosure relates to optical devices with high isolation capabilities, and more particularly, to optical devices for isolating a diagnostic signal, which could be used to detect fiber events such as fiber damage, from a communications or carrier signal.

Technical Background

Rapid development in the telecommunications industry has led to mass deployment of fiber optic networks. Optical time-domain reflectometry (OTDR) and other types of diagnostic systems are frequently employed as a diagnostic tool in fiber optic networks. In OTDR-type systems, a pulsed laser sends a short and intense laser pulse down the fiber to be tested. At a place where fiber has a cut or experiences some other event that results in a back-reflection, the reflected pulse will retro-reflectively traverse the fiber to the originating device to be measured. A clocking system is put in place to accurately count the travel time and report the fiber event location. In order not to interfere with the common communication signal within the optical network during the diagnosis, a wavelength division multiplexing (WDM) system is used to pass communications data and reflect back the diagnostic signal. The concepts of the present disclosure are directed towards isolating these and other types of diagnostic signals used in fiber optic networks from other non-diagnostic signals propagating through the network.

BRIEF SUMMARY

The present inventors have recognized a continuing drive to improve the performance and stability of solutions and devices for isolating or filtering diagnostic signals from communications signals in a fiber optic network and present herein a solution that provides for relatively high isolation while maintaining a compact form factor.

In accordance with one embodiment of the present disclosure, an optical signal isolation device comprises a multi-signal fiber comprising a common port, an isolated diagnostic signal fiber comprising an isolated diagnostic port, an integrated circulator comprising an input circulator fiber, an output circulator fiber, and a fiber-to-fiber optical coupler configured to couple an isolated optical signal propagating along the input circulator fiber to the output circulator fiber for propagation along the output circulator fiber, a multi-fiber alignment body that secures at least portions of each of the multi-signal fiber, the isolated diagnostic signal fiber, the input circulator fiber, and the output circulator fiber, and a wavelength-selective optical assembly. The wavelength-selective optical assembly comprises an optical signal filter tuned to pass a communications component of an incident optical signal and to reflect a diagnostic component of an incident optical signal, fiber-to-filter focusing optics, and a communications signal reflector. In the optical signal isolation device the integrated circulator and the wavelength selective optical assembly are structurally configured and optically oriented such that the communications component of the incident optical signal passes from the common port through the multi-signal fiber, through the optical signal filter, to the communications signal reflector, back through the optical signal filter, to the multi-signal fiber, and back through the common port, the diagnostic component of the incident optical signal passes from the common port through the multi-signal fiber, is reflected by the optical signal filter to the input circulator fiber of the integrated circulator, where the diagnostic component is coupled to output circulator fiber and travels from the output circulator fiber to the optical signal filter for reflection to the isolated diagnostic signal fiber and transmission through the isolated diagnostic port.

In accordance with another embodiment of the present disclosure, an optical signal isolation device comprises a multi-signal fiber comprising a common port, an isolated diagnostic signal fiber comprising an isolated diagnostic port, an integrated circulator comprising an input circulator fiber, an output circulator fiber, and a fiber-to-fiber optical coupler configured to couple an isolated optical signal propagating along the input circulator fiber to the output circulator fiber for propagation along the output circulator fiber. The optical signal isolation device further comprises a multi-fiber alignment body that secures at least portions of each of the multi-signal fiber, the isolated diagnostic signal fiber, the input circulator fiber, and the output circulator fiber to collimate the secured portions of each of the multi-signal fiber, the isolated diagnostic signal fiber, the input circulator fiber, and the output circulator fiber relative to each other and a wavelength-selective optical assembly comprising an optical signal filter tuned to pass a communications component of an incident optical signal and to reflect a diagnostic component of an incident optical signal, fiber-to-filter focusing optics comprising a common lens element, and a communications signal reflector. In the optical signal isolation device the integrated circulator, the optical signal filter, the common lens element of the fiber-to-filter focusing optics, and the communications signal reflector are structurally configured and optically oriented such that the communications component of the incident optical signal passes from the common port through the multi-signal fiber, through the optical signal filter, to the communications signal reflector, back through the optical signal filter, to the multi-signal fiber, and back through the common port, the diagnostic component of the incident optical signal passes from the common port through the multi-signal fiber, is reflected by the optical signal filter to the input circulator fiber of the integrated circulator, where the diagnostic component is coupled to output circulator fiber and travels from the output circulator fiber to the optical signal filter for reflection to the isolated diagnostic signal fiber and transmission through the isolated diagnostic port, and the signal isolation, as measured at the isolated diagnostic port, is greater than approximately 30 dB.

Although the concepts of the present disclosure are described herein with primary reference to filtering the diagnostic component of an optical signal from the communications component of an optical signal, it is contemplated that the concepts will enjoy applicability to any optical signal filtration. For example, and not by way of limitation, it is contemplated that the concepts of the present disclosure will enjoy applicability to filtering multiple communications components of the same signal from one another.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION OF THE DRAWINGS

Figure 1:
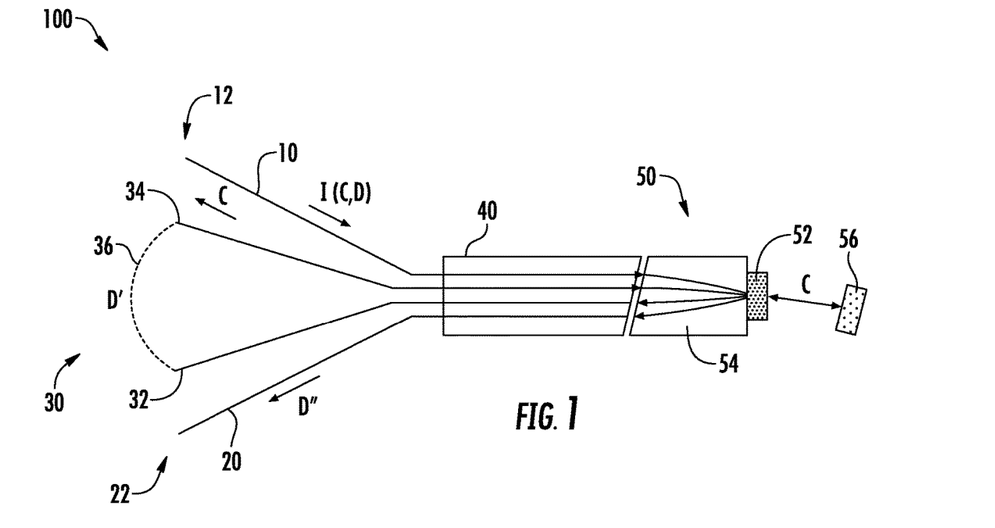
FIG. 1 illustrates a two-port optical signal isolation device according to one embodiment of the present disclosure.

Referring initially to FIG. 1, an optical signal isolation device 100 is illustrated comprising a multi-signal fiber 10 comprising a common port 12. The multi-signal fiber 10 carries an incident optical signal I comprising a communications component C and a diagnostic component D. The optical signal isolation device 100 further comprises an isolated diagnostic signal fiber 20 comprising an isolated diagnostic port 22 and an integrated circulator 30 comprising an input circulator fiber 32, an output circulator fiber 34, and a fiber-to-fiber optical coupler 36. The fiber-to-fiber optical coupler 36 is configured to couple an isolated optical signal D' propagating along the input circulator fiber 32 to the output circulator fiber 34 for propagation along the output circulator fiber 34.

The optical signal isolation device 100 further comprises a multi-fiber alignment body 40 that secures at least portions of each of the multi-signal fiber 10, the isolated diagnostic signal fiber 20, the input circulator fiber 32, and the output circulator fiber 34. The optical signal isolation device 100 further comprises a wavelength-selective optical assembly 50 comprising an optical signal filter 52. The optical signal filter 52 is tuned to pass the communications component C of the incident optical signal I and to reflect the diagnostic component D of the incident optical signal I. The wavelength-selective optical assembly 50 further comprises fiber-to-filter focusing optics 54 and a communications signal reflector 56. The integrated circulator 30 and the wavelength-selective optical assembly 50 are structurally configured and optically oriented such that the communications component C of the incident optical signal I passes from the common port 12 through the multi-signal fiber 10, through the optical signal filter 52, to the communications signal reflector 56, back through the optical signal filter 52, to the multi-signal fiber 10, and back through the common port 12.

The diagnostic component D of the incident optical signal I passes from the common port 12 through the multi-signal fiber 10, is reflected by the optical signal filter 52 to the input circulator fiber 32 of the integrated circulator 30, where the diagnostic component D is coupled as an isolated diagnostic signal D' to the output circulator fiber 34. The isolated diagnostic signal D' travels from the output circulator fiber 34 to the optical signal filter 52 for reflection to the isolated diagnostic signal fiber 20 and transmission through the isolated diagnostic port 22 as a further isolated diagnostic signal D". In this manner, the optical signal filter 52 can be used to provide two degrees of optical isolation of the diagnostic component D of the incident optical signal I.

Still referring to FIG. 1, in some embodiments of the optical signal isolation device 100, the fiber-to-fiber optical coupler 36 directly couples the isolated diagnostic signal D' of the diagnostic component D propagating along the input circulator fiber 32 to the output circulator fiber 34. In other embodiments, such as those illustrated in FIG. 2 below, the fiber-to-fiber optical coupler 36 indirectly couples the isolated optical signal D' propagating along the input circulator fiber 32 to the output circulator fiber 34. For four-fiber configurations, like that illustrated in FIG. 1, it is contemplated that the signal isolation, as measured at the isolated diagnostic port 22, will be greater than approximately 30 dB or, more particularly, between about 20 dB and about 40 dB.

Figure 2:
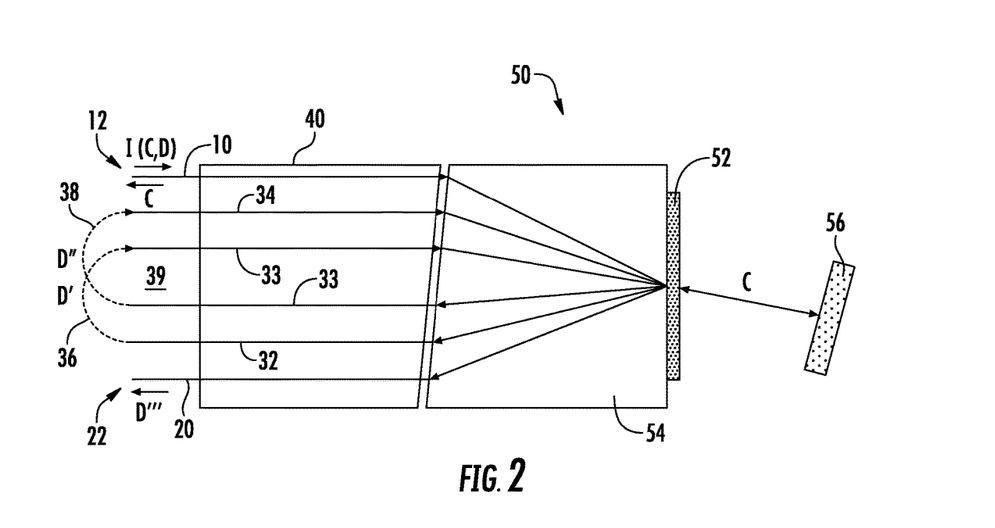
FIG. 2 illustrates a two-port optical signal isolation device according to an alternative embodiment of the present disclosure.

Referring now to FIG. 2, where the fiber-to-fiber optical coupler 36 indirectly couples the isolated optical signal D' propagating along the input circulator fiber 32 to the output circulator fiber 34, the integrated circulator 30 comprises one or more pairs of intermediate fibers 33 and one or more additional fiber-to-fiber couplers 38. Each intermediate fiber pair 33 and additional fiber-to-fiber coupler 38 comprises an intermediate isolation loop, such as intermediate isolation loop 39. The intermediate isolation loop 39 indirectly couples the isolated optical signal D' propagating along the input circulator fiber 32 to the output circulator fiber 34 in the form of a further optically isolated signal D".

Optical signal isolation devices 100 contemplated herein effectively filter the diagnostic component D of the incident optical signal I at the optical signal filter 52 n+2 times, where n is equal to the number of intermediate isolation loops. For example, in the embodiment illustrated in FIG. 1, there are no intermediate isolation loops, so it may be said that the optical signal isolation device 100 filters the diagnostic component D of the incident optical signal I two times. In FIG. 2, where there is one intermediate isolation loop 39, the optical signal isolation device 100 filters the diagnostic component three times. In embodiments with one or more intermediate isolation loops, the signal isolation, as measured at the isolated diagnostic port 22, is greater than approximately 30 dB or, more particularly, between 20 dB and 40 dB.

The fiber-to-fiber optical coupler 36 may comprise an optical splice, a pair of optical connectors, a pair of optical collimators, an optical isolator, combinations thereof, or any conventional or yet-to-be developed means for coupling an optical signal from one optical fiber to the next.

Referring to both FIGS. 1 and 2, some embodiments of the optical signal isolation device 100 the multi-fiber alignment body 40 are configured to collimate the secured portions of each of the multi-signal fiber 10, the isolated diagnostic signal fiber 20, the input circulator fiber 32, and the output circulator fiber 34 relative to each other. In other embodiments, it is contemplated that the multi-fiber alignment body 40 may be sized and shaped to fit inside an optical connector subassembly comprising the multi-fiber alignment body 40 and a ferrule.

Figure 11:
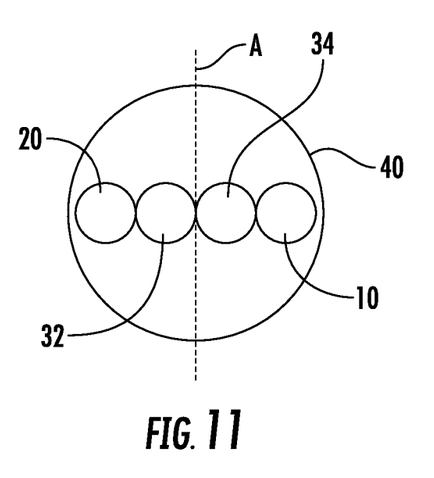
FIG. 11 illustrates a multi-fiber alignment body according to one embodiment of the present disclosure.
Figure 12:
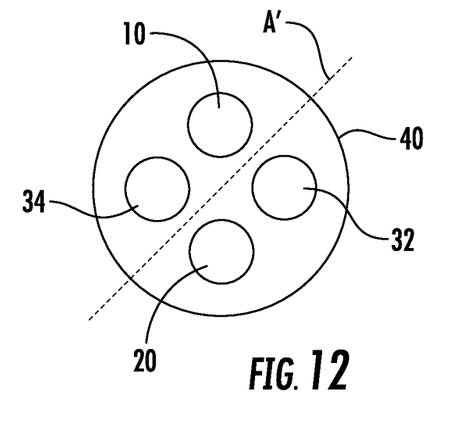
FIG. 12 illustrates a multi-fiber alignment body according to an alternative embodiment of the present disclosure.

The multi-fiber alignment body 40 may hold each of the optical fibers in a common alignment plane. As shown by FIGS. 11 and 12, the multi-fiber alignment body 40 may hold the multi-signal fiber 10 and the input circulator fiber 32 in a first fiber pair and the output circulator fiber 34 and the isolated diagnostic signal fiber 20 in a second fiber pair and the first and second fiber pairs may be symmetrically aligned across one or more axes of reflection, such as the axes of reflection A, A'. In some embodiments, such as that illustrated in FIGS. 11 and 12, the first and second fiber pairs may be configured to share a common axis of reflection. In other embodiments, the first and second fiber pairs may be symmetrically aligned across separate axes of reflection. Additionally, it is contemplated that the fiber pairs may be secured in the multi-fiber alignment body 40 in a variety of ways, including any conventional or yet-to-be developed way of securing fiber optic components in a preferred position and orientation. For example, in one embodiment, the first and second fiber pairs are fixed within the multi-fiber alignment body with an optical epoxy or other optical adhesive.

Referring back to FIGS. 1 and 2, the fiber-to-filter focusing optics 54 of the wavelength-selective optical assembly 50 may be presented as a common lens element that is configured to focus the incident optical signal I such that the communications component C is reflected from the communications signal reflector 56 back to the common port 12 and the diagnostic component D is reflected from the multi-signal fiber 10 to the input circulator fiber 32 and from the output circulator fiber 34 to the isolated diagnostic port 22.

Figure 3:
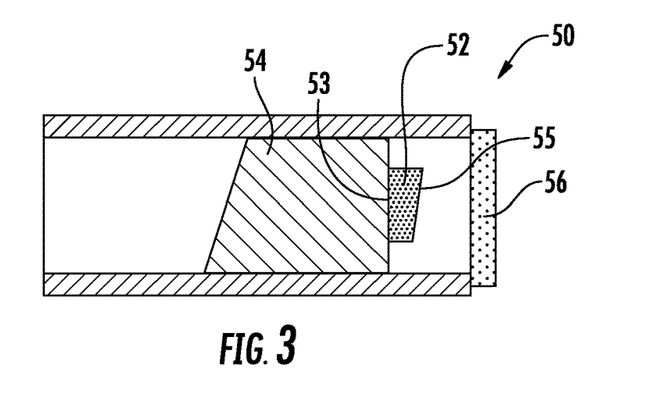
FIGS. 3-5 illustrate a wavelength-selective optical assembly according to various alternative embodiments of the present disclosure.

Referring now to FIGS. 1 and 3, embodiments of the optical signal isolation device 100 may include an optical signal filter 52 comprising a lens-side surface 53 and a reflector-side surface 55 and the reflector-side surface 55 may comprise an angled optical surface that is configured to direct the communications component C from the multi-signal fiber 10 to the communications signal reflector 56 and back to the multi-signal fiber 10 and to direct the diagnostic component D from the multi-signal fiber 10 to the input circulator fiber 32 and from the output circulator fiber 34 to the isolated diagnostic signal fiber 20.

Figure 4:
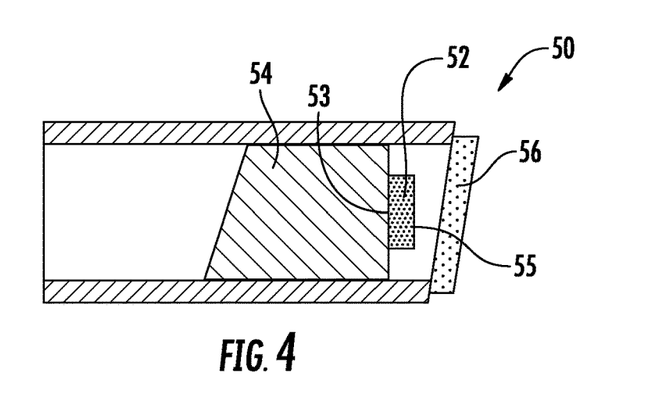

As shown in FIGS. 1 and 4, the communications signal reflector 56 may be positioned at an angle to direct the reflection of the communications component C from the multi-signal fiber 10 to the communications signal reflector 56 and back to the multi-signal fiber 10.

Figure 5:
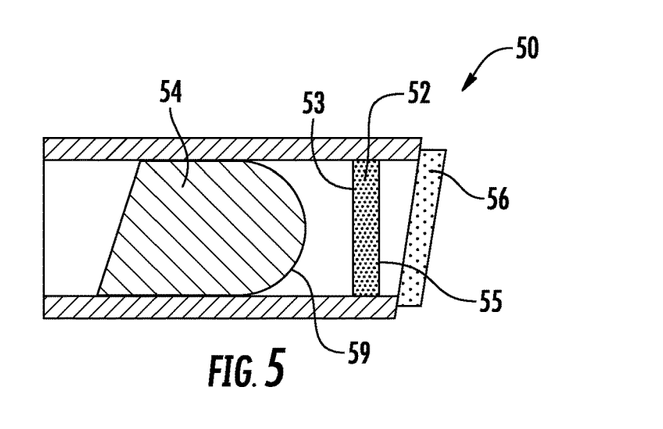

Referring to FIGS. 1 and 5, in some embodiments, at least one of the surfaces of the common lens element forming the fiber-to-filter focusing optics 54 may be configured as a convex surface 59 having a radius of curvature configured to focus the incident optical signal I such that the communications component C passes to the communications signal reflector 56, and the diagnostic component passes D from the common port 12 to the input circulator fiber 32.

It is contemplated that the common lens element forming the fiber-to-filter focusing optics 54 may be provided as a normal biconvex lens. In other embodiments, the common lens element may be a positive meniscus lens or a plano-convex lens with a curved end surface secured in a tube. It is contemplated that the common lens element forming the fiber-to-filter focusing optics 54 may be any suitable conventional, or yet-to-be developed, means of appropriately focusing the various optical signals, for example, the common lens element may be a gradient index (GRIN) lens. Additionally, it is contemplated that the focusing optics may use two or more lenses in any combination of workable lenses.

Figure 6:
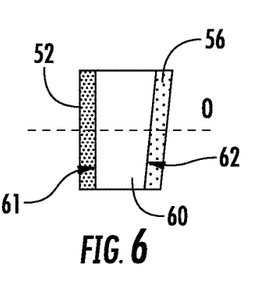
FIGS. 6-9 illustrate a wavelength-selective optical assembly according to various alternative embodiments of the present disclosure.

Referring to FIG. 6, it is contemplated that a wavelength-selective optical assembly according to the present disclosure may be provided in more compact form by providing an assembly substrate 60 supporting a filter coating and a reflective coating. In this embodiment, the assembly substrate 60 may comprise a lens-side surface 61 and a reflector-side surface 62. The lens-side surface 61 of the assembly substrate 60 may comprise the filter coating defining the optical signal filter 52 and the reflector-side surface 62 of the assembly substrate 60 may comprises the reflective coating defining the communications signal reflector 56. Where appropriate, the reflector-side surface 62 may be angled relative to an optical axis O of the fiber-to-filter focusing optics 54.

Figure 7:
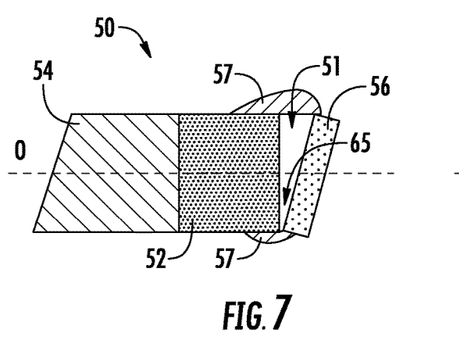
Figure 8:
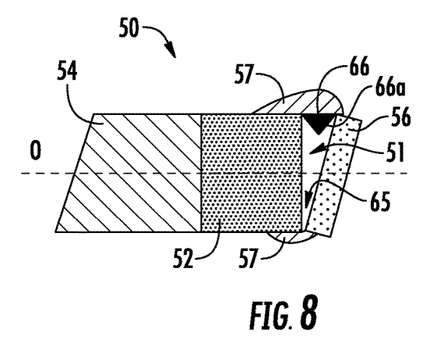
Figure 9:
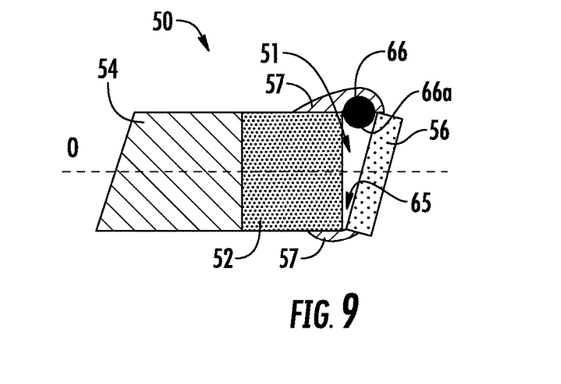

Referring to FIGS. 7-9, in some embodiments, the communications signal reflector 56 is positioned at a reflection angle 65 relative to the optical axis O and is fixed to the optical signal filter 52 to direct the reflection of the communications component C from the multi-signal fiber 10 to the communications signal reflector 56 and back to the multi-signal fiber 10 (as shown in FIG. 1). The communications signal reflector 56 may be fixed to the optical signal filter 52 to define an air gap 51 that increases in width from an origin of the reflection angle 65 to a terminus of the reflection angle 65. In some embodiments, such as shown in FIGS. 8 and 9, the wavelength-selective optical assembly 50 further comprises a tuning spacer 66 positioned at the terminus of the reflection angle 65. In some embodiments, the tuning spacer 66 comprises an angled or curved tuning surface 66a. In some embodiments, the tuning spacer 66 comprises a triangular post (FIG. 8) or a cylinder (FIG. 9). It is contemplated, for example, that the communications signal reflector 56 and the tuning spacer 66 may be fixed in place by an adhesive 57 or any suitable conventional, or yet-to-be developed, means of securing two optical components to each other.

Still referring to FIGS. 7-9, in some embodiments, the angle at which the communications signal reflector 56 is fixed is between about 2.0 and about 4.5 degrees. In some embodiments, the angle at which the communications signal reflector is fixed is between about 2.8 and about 3.5 degrees.

Figure 10:
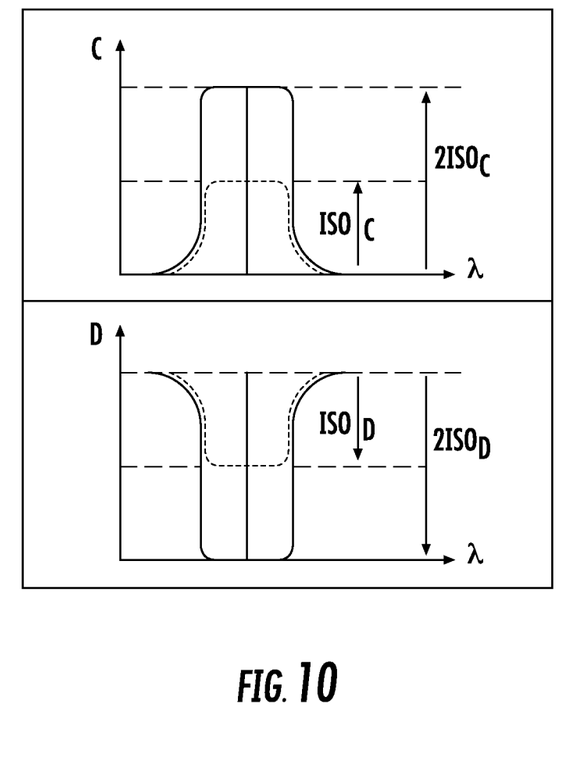
FIG. 10 illustrates the isolating effect of embodiments of the two-port isolation device according to embodiments of the present disclosure.

Referring to FIG. 10, a graphical representation of the isolation of the diagnostic component D and the communications component C from the incident optical signal I is shown. In embodiments such as shown in FIG. 1, the diagnostic component D is filtered twice by the optical signal filter, once upon reflection from the multi-signal fiber 10 to the input circulator fiber 32, and once again upon reflection from the output circulator fiber 34 to the isolated diagnostic signal fiber 20. This double filtering of the diagnostic component results in a high signal to noise (SNR) ratio for the diagnostic component D and is represented by the $2ISO_D$ symbol on the chart of FIG. 10. The communications component is also double filtered as it passes through the optical signal filter 52, is reflected by the communications signal reflector 56 and returns to the multi-signal fiber 10 through the optical signal filter 52. Thus, the optical signal isolation device 100 double filters the communications component C as well, also resulting in a high SNR.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the terms "approximately" and "about" are utilized herein to represent the inherent degree of uncertainty that may be attributed to any quantitative comparison, value, measurement, or other representation. The terms "approximately" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An optical signal isolation device comprising:
   a multi-signal fiber comprising a common port;
   an isolated diagnostic signal fiber comprising an isolated diagnostic port;
   an integrated circulator comprising an input circulator fiber, an output circulator fiber, and a fiber-to-fiber optical coupler configured to couple an isolated optical signal propagating along the input circulator fiber to the output circulator fiber for propagation along the output circulator fiber;
   a multi-fiber alignment body that secures at least portions of each of the multi-signal fiber, the isolated diagnostic signal fiber, the input circulator fiber, and the output circulator fiber; and
   a wavelength-selective optical assembly comprising
      an optical signal filter tuned to pass a communications component of an incident optical signal and to reflect a diagnostic component of an incident optical signal,
      fiber-to-filter focusing optics, and
      a communications signal reflector, wherein
   the integrated circulator and the wavelength selective optical assembly are structurally configured and optically oriented such that
      the communications component of the incident optical signal passes from the common port through the multi-signal fiber, through the optical signal filter, to the communications signal reflector, back through the optical signal filter, to the multi-signal fiber, and back through the common port,
      the diagnostic component of the incident optical signal passes from the common port through the multi-signal fiber, is reflected by the optical signal filter to the input circulator fiber of the integrated circulator, where the diagnostic component is coupled to output circulator fiber and travels from the output circulator fiber to the optical signal filter for reflection to the isolated diagnostic signal fiber and transmission through the isolated diagnostic port.

2. The optical signal isolation device of claim 1, wherein the fiber-to-fiber optical coupler directly couples the isolated optical signal propagating along the input circulator fiber to the output circulator fiber.

3. The optical signal isolation device of claim 2, wherein the signal isolation, as measured at the isolated diagnostic port, is greater than approximately 30 dB.

4. The optical signal isolation device of claim 2, wherein the signal isolation, as measured at the isolated diagnostic port, is between 20 dB and 40 dB.

5. The optical signal isolation device of claim 1, wherein the fiber-to-fiber optical coupler indirectly couples the isolated optical signal propagating along the input circulator fiber to the output circulator fiber.

6. The optical signal isolation device of claim 5, wherein:
   the integrated circulator comprises one or more pairs of intermediate fibers and one or more additional fiber-to-fiber couplers;
   each intermediate fiber pair and additional fiber-to-fiber coupler comprises an intermediate isolation loop; and
   the intermediate isolation loop indirectly couples the isolated optical signal propagating along the input circulator fiber to the output circulator fiber.

7. The optical signal isolation device of claim 6, wherein the diagnostic component of the incident diagnostic signal is filtered at the optical signal filter n+2 times, where n is equal to the number of intermediate isolation loops.

8. The optical signal isolation device of claim 5, wherein the signal isolation, as measured at the isolated diagnostic port, is greater than approximately 30 dB.

9. The optical signal isolation device of claim 5, wherein the signal isolation, as measured at the isolated diagnostic port, is between 20 dB and 40 dB.

10. The optical signal isolation device of claim 1, wherein the multi-fiber alignment body is configured to collimate the secured portions of each of the multi-signal fiber, the isolated diagnostic signal fiber, the input circulator fiber, and the output circulator fiber relative to each other.

11. The optical signal isolation device of claim 1, wherein the multi-fiber alignment body holds each of the fibers in a common alignment plane.

12. The optical signal isolation device of claim 1, wherein the multi-fiber alignment body holds the multi-signal fiber and the input circulator fiber in a first fiber pair and the output circulator fiber and the diagnostic signal fiber in a second fiber pair and the first and second fiber pairs are symmetrically aligned across one or more axes of reflection.

13. The optical signal isolation device of claim 1, wherein the fiber-to-filter focusing optics of the wavelength-selective optical assembly comprises a common lens element configured to focus the incident optical signal such that the communications component is reflected from the communications signal reflector back to the common port and the diagnostic component is reflected from the multi-signal fiber to the input circulator fiber and from the output circulator fiber to the isolated diagnostic port.

14. The optical signal isolation device of claim 1, wherein:

the optical signal filter comprises a lens-side surface and a reflector-side surface and the reflector-side surface comprises an angled optical surface that is configured to direct the communications component from the multi-signal fiber to the communications signal reflector and back to the multi-signal fiber and to direct the diagnostic component from the multi-signal fiber to the input circulator fiber and from the output circulator fiber to the isolated diagnostic signal fiber.

15. The optical signal isolation device of claim 1, wherein the communications signal reflector is positioned at an angle to direct the reflection of the communications component from the multi-signal fiber to the communications signal reflector and back to the multi-signal fiber.

16. The optical signal isolation device of claim 1, wherein at least one of the surfaces of the common lens element is configured as a convex surface having a radius of curvature configured to focus the incident optical signal such that the communications component passes to the communications signal reflector, and the diagnostic component passes from the common port to the input circulator.

17. The optical signal isolation device of claim 1 wherein:
the wavelength selective optical assembly comprises an assembly substrate comprising a lens-side surface and a reflector-side surface;
the lens-side surface of the assembly substrate comprises a filter coating defining the optical signal filter; and
the reflector-side surface of the assembly substrate comprises a reflective coating defining the communications signal reflector and is angled relative to an optical axis of the fiber-to-filter focusing optics.

18. The optical signal isolation device of claim 1, wherein:
the communications signal reflector is positioned at a reflection angle relative to an optical axis of the common lens element and is fixed to the optical filter to direct the reflection of the communications component from the multi-signal fiber to the communications signal reflector and back to the multi-signal fiber; and
the communications signal reflector is fixed to the optical filter to define an air gap that increases in width from an origin of the reflection angle to a terminus of the reflection angle.

19. The optical signal isolation device of claim 18, wherein the wavelength selective optical assembly further comprises a tuning spacer positioned at the terminus of the reflection angle.

20. An optical signal isolation device comprising:
a multi-signal fiber comprising a common port;
an isolated diagnostic signal fiber comprising an isolated diagnostic port;
an integrated circulator comprising an input circulator fiber, an output circulator fiber, and a fiber-to-fiber optical coupler configured to couple an isolated optical signal propagating along the input circulator fiber to the output circulator fiber for propagation along the output circulator fiber;
a multi-fiber alignment body that secures at least portions of each of the multi-signal fiber, the isolated diagnostic signal fiber, the input circulator fiber, and the output circulator fiber to collimate the secured portions of each of the multi-signal fiber, the isolated diagnostic signal fiber, the input circulator fiber, and the output circulator fiber relative to each other;
a wavelength-selective optical assembly comprising
an optical signal filter tuned to pass a communications component of an incident optical signal and to reflect a diagnostic component of an incident optical signal,
fiber-to-filter focusing optics comprising a common lens element, and
a communications signal reflector, wherein
the integrated circulator, the optical signal filter, the common lens element of the fiber-to-filter focusing optics, and the communications signal reflector are structurally configured and optically oriented such that
the communications component of the incident optical signal passes from the common port through the multi-signal fiber, through the optical signal filter, to the communications signal reflector, back through the optical signal filter, to the multi-signal fiber, and back through the common port,
the diagnostic component of the incident optical signal passes from the common port through the multi-signal fiber, is reflected by the optical signal filter to the input circulator fiber of the integrated circulator, where the diagnostic component is coupled to output circulator fiber and travels from the output circulator fiber to the optical signal filter for reflection to the isolated diagnostic signal fiber and transmission through the isolated diagnostic port, and
the signal isolation, as measured at the isolated diagnostic port, is greater than approximately 30 dB.

21. An optical signal isolation device comprising:
a multi-signal fiber comprising a common port;
an isolated identification signal fiber comprising an isolated identification port;
an integrated circulator comprising an input circulator fiber, an output circulator fiber, and a fiber-to-fiber optical coupler configured to couple an isolated identification signal propagating along the input circulator fiber to the output circulator fiber for propagation along the output circulator fiber;
a multi-fiber alignment body that secures at least portions of each of the multi-signal fiber, the isolated identification signal fiber, the input circulator fiber, and the output circulator fiber; and
a wavelength-selective optical assembly comprising
an optical signal filter tuned to pass carrier component of an incident optical signal and to reflect an identification component of an incident optical signal,
fiber-to-filter focusing optics, and
a carrier signal reflector, wherein
the integrated circulator and the wavelength selective optical assembly are structurally configured and optically oriented such that
the carrier component of the incident optical signal passes from the common port through the multi-signal fiber, through the optical signal filter, to the carrier signal reflector, back through the optical signal filter, to the multi-signal fiber, and back through the common port,
the identification component of the incident optical signal passes from the common port through the multi-signal fiber, is reflected by the optical signal filter to the input circulator fiber of the integrated circulator, where the identification component is coupled to the output circulator fiber and travels from the output circulator fiber to the optical signal filter for reflection to the isolated identification signal fiber and transmission through the isolated identification port.

* * * * *